United States Patent [19]

Huber et al.

[11] Patent Number: 5,725,789
[45] Date of Patent: Mar. 10, 1998

[54] AQUEOUS OIL AND WATER REPELLENT COMPOSITIONS

[75] Inventors: Charles D. Huber, Oakdale; Michael A. Yandrasits, Hastings, both of Minn.

[73] Assignee: Minnesota Mining and Manufacturing Company, St. Paul, Minn.

[21] Appl. No.: 737,686

[22] PCT Filed: Mar. 31, 1995

[86] PCT No.: PCT/US95/03949

§ 371 Date: Nov. 13, 1996

§ 102(e) Date: Nov. 13, 1996

[87] PCT Pub. No.: WO96/30584

PCT Pub. Date: Oct. 3, 1996

[51] Int. Cl.[6] .............. D06M 15/576; C08L 75/00; C08L 27/12; C09K 3/00
[52] U.S. Cl. .............. 252/8.62; 106/2; 427/393.4; 428/375; 428/423.1; 524/507; 524/520; 524/544; 524/805; 525/200; 526/243; 526/245; 526/248; 528/70
[58] Field of Search .............. 252/8.62; 106/2; 427/389.9, 393.4; 428/423.1, 375; 524/507, 520, 544, 805; 525/200; 528/70; 526/243, 245, 248

[56] References Cited

U.S. PATENT DOCUMENTS

| | | | |
|---|---|---|---|
| Re. 30,337 | 7/1980 | Loudas | 8/142 |
| 2,592,069 | 4/1952 | Reid | 526/245 |
| 2,642,416 | 6/1953 | Ahlbrecht et al. | 526/245 |
| 2,803,615 | 8/1957 | Ahlbrecht et al. | 524/805 |
| 2,826,564 | 3/1958 | Bovey et al. | 526/246 |
| 2,995,542 | 8/1961 | Brown | 526/243 |
| 3,078,245 | 2/1963 | Heine | 428/421 |
| 3,081,274 | 3/1963 | Heine | 524/463 |
| 3,102,103 | 8/1963 | Ahlbrecht et al. | 428/355 AC |
| 3,282,905 | 11/1966 | Fasick et al. | 526/245 |
| 3,291,843 | 12/1966 | Fritz et al. | 568/674 |
| 3,304,278 | 2/1967 | Haptschein et al. | 524/805 |
| 3,325,163 | 6/1967 | Off et al. | 270/59 |
| 3,574,791 | 4/1971 | Sherman et al. | 525/276 |
| 3,654,244 | 4/1972 | Pittman et al. | 526/243 |
| 3,728,151 | 4/1973 | Sherman et al. | 442/80 |
| 3,748,268 | 7/1973 | Loudas | 8/142 |
| 3,759,874 | 9/1973 | Gresham | 528/70 |
| 3,780,092 | 12/1973 | Samour et al. | 560/222 |
| 3,787,351 | 1/1974 | Olson | 523/453 |
| 3,816,167 | 6/1974 | Schultz et al. | 442/94 |
| 3,896,035 | 7/1975 | Schultz et al. | 252/8.62 |
| 3,901,727 | 8/1975 | Loudas | 134/4 |
| 3,920,614 | 11/1975 | Kirimoto et al. | 546/245 |
| 3,928,423 | 12/1975 | Samour et al. | 560/169 |
| 3,936,492 | 2/1976 | Samour et al. | 560/155 |
| 4,001,259 | 1/1977 | Meyer et al. | 546/292 |
| 4,011,259 | 3/1977 | Samour et al. | 560/193 |
| 4,013,627 | 3/1977 | Temple | 526/245 |
| 4,029,585 | 6/1977 | Dettre et al. | 252/602 |
| 4,043,923 | 8/1977 | Loudas | 252/8.62 |
| 4,043,964 | 8/1977 | Sherman et al. | 524/520 |
| 4,107,055 | 8/1978 | Sukornick et al. | 442/94 |
| 4,115,605 | 9/1978 | Hultman et al. | 427/372 |
| 4,127,711 | 11/1978 | Lore et al. | 526/245 |
| 4,147,851 | 4/1979 | Raynolds | 526/245 |

(List continued on next page.)

FOREIGN PATENT DOCUMENTS

| | | |
|---|---|---|
| 0542598A1 | 5/1993 | European Pat. Off. |
| 48-32999 | 10/1973 | Japan |
| 59-109575 | 6/1984 | Japan |
| 63-105175 | 5/1988 | Japan |
| 937469 | 6/1982 | U.S.S.R. |
| 1147718 | 3/1985 | U.S.S.R. |
| WO 93/01349 | 1/1993 | WIPO |

OTHER PUBLICATIONS

Chemical Abstract No. 101:153439 which is an abstract of European Patent Specification No. 109171 (May, 1984).
Association of Textile Chemists and Colorists (AATCC) Test Method No. 118–1992 No month recited.
AATCC Test Method No. 8–1989 No month recited.
AATCC Test Method No. 22–1989 No month recited.
Polymerization of surface–active monomers:4. Copolymerization of long–chain alkyl salts of 2–dimethylaminoethyl methacrylate with methyl methacrylate or styrene, Polymer, 1992, vol. 33,No. 14 No month recited.
Polymerized Micelles: Fact or Fancy?, J. Chem. Soc., Chem. Commun., 1986, pp. 936–938 No month recited.
New Quaternary Surfactants for Alkaline Hydrolysis of Polyesters, American Dyestuff Reporter, Dec. 1984, pp. 37–46.
Polymerization of Surface–Active Monomers. II. Polymerization of Quarternary Alkyl Salts of Dimethylaminoethyl Methacrylate with a Different Alkyl Chain Length, Journal of Polymer Science: Part A: Polymer Chemistry, vol. 25, pp. 1–14, (1987) No month recited.
Novel quaternary ammonium amphiphilic (meth) acrylates: 1. Synthesis, melting and interfacial behaviour, Polymer, Feb. 1987, vol. 28 pp. 325–331.

*Primary Examiner*—Anthony Green
*Attorney, Agent, or Firm*—Gary L. Griswold; Walter N. Kirn; Daniel R. Pastirik

[57] ABSTRACT

Oil and water repellent compositions for the treatment of fiber containing substrates such as fabric and the like, substrates treated with these compositions and methods for the treatment of substrates are described. The compositions of the invention comprise (a) a polyalkoxylated polyurethane and (b) a fluorochemical acrylate polymer comprising the polymerized reaction product of a fluorinated acrylate or methacrylate monomer, at least one alkyl acrylate or methacrylate monomer and a polymerizable cationic emulsifier comprising a quaternary amine surfactant. Additionally, (c) a polyalkylene glycol fluorochemical acrylate copolymer and (d) a fluorochemical adipate ester can also be included within the compositions. The above components are blended together within the composition at a weight ratios of (a):(b), or (a)+(c):(b), or (a)+(c)+(d):(b) of from 19:1 to 1:19 and preferably about 1:1. The compositions may be applied to a variety of fiber containing substrates to achieve a broad range of oil and water repellent properties.

35 Claims, No Drawings

U.S. PATENT DOCUMENTS

| | | | |
|---|---|---|---|
| 4,160,777 | 7/1979 | Loudas | 558/54 |
| 4,264,484 | 4/1981 | Patel | 524/168 |
| 4,289,892 | 9/1981 | Soch | 560/26 |
| 4,366,299 | 12/1982 | Dessaint | 526/243 |
| 4,419,298 | 12/1983 | Falk et al. | 554/94 |
| 4,474,982 | 10/1984 | Howells | 560/223 |
| 4,525,423 | 6/1985 | Lynn et al. | 428/421 |
| 4,529,658 | 7/1985 | Schwartz et al. | 428/421 |
| 4,579,924 | 4/1986 | Schwartz et al. | 526/243 |
| 4,582,882 | 4/1986 | Lynn et al. | 526/243 |
| 4,668,726 | 5/1987 | Howells | 524/225 |
| 4,681,790 | 7/1987 | Fong | 428/96 |
| 4,788,287 | 11/1988 | Matsuo et al. | 544/196 |
| 4,792,354 | 12/1988 | Matsuo et al. | 106/2 |
| 4,795,793 | 1/1989 | Amimoto et al. | 526/243 |
| 4,859,754 | 8/1989 | Maekawa et al. | 526/245 |
| 4,983,666 | 1/1991 | Zavatteri et al. | 524/539 |
| 5,247,008 | 9/1993 | Michels et al. | 524/544 |
| 5,350,795 | 9/1994 | Smith et al. | 524/507 |

AQUEOUS OIL AND WATER REPELLENT COMPOSITIONS

This invention relates to oil and water repellent compositions for the treatment of fabrics and other fiber containing substrates at ambient conditions, to the treated substrates and to methods of treating those substrates.

BACKGROUND OF THE INVENTION

Substrates such as woven fabrics, carpeting, upholstery and the like become soiled and stained when used, requiring frequent and repeated cleaning. Various chemical compositions have been proposed for the protection of such substrates against water and oil based soils and/or stains, and the patent literature describes many such compositions. U.S. Pat. No. 5,350,795 to Smith et al., for example, includes a partial listing and discussion of the patent literature relating to fluorochemical compositions for the treatment of textiles and the like. As the literature indicates, fluorochemical compounds have been used successfully in the treatment of various substrates to render them more resistant to staining and, therefore, easier to clean.

Even though fluorochemicals have found fairly widespread use, fluorochemicals have generally required the inclusion of significant amounts of organic solvents which may be undesirable. The use of water based fluorochemical compositions (e.g., those which do not include significant organic solvents), while more acceptable, has been less than satisfactory because such aqueous compositions have generally required the performance of additional steps in the application of the composition to a substrate, such as the application of heat to the treated substrate. In light of the foregoing, it is desirable to provide oil and water repellent fluorochemical compositions which do not require a significant amount of organic solvent and which can be applied to a substrate and dried at ambient conditions to impart oil and water repellency.

In the evaluation of the oil and water repellent properties of treated substrates, certain known tests are employed to measure the degree to which a substrate effectively repels water and oil under different conditions. For any given composition, identical tests are performed on a number of different substrates (e.g., different fabric types) to fully assess the degree to which the composition is effective in protecting specific materials. As a result of such assessments, it is known that while some fluorochemical compositions will provide favorable or at least acceptable test results according to some of the aforementioned tests, the art has generally failed to provide a composition which is substantially free of organic solvents and which provides an improved range of oil and water repellent properties. Therefore, it is desirable to provide a composition suitable for the treatment of fiber-containing substrates which can be formulated and applied without significant mounts of organic solvents to provide a range of improved oil and water repellent properties at ambient conditions (e.g., the composition can be applied at room temperature without additional thermal treatment).

SUMMARY OF THE INVENTION

The present invention provides fluorochemical compositions suitable for application on a variety of fiber-containing substrates such as fabrics and textile fibers comprising cotton, nylon, polyester, polyolefin, acrylic, acetate, leather or blends thereof and materials such as apparel, upholstery and carpet to impart a broad range of oil and water repellent properties. The compositions of the invention are water based formulations which may be applied to substrates and dried without thermal treatment, i.e., at ambient conditions. Applicants have found that a class of fluorochemical acrylate polymers having a polymerizable cationic emulsifier incorporated with the polymer can be blended with polyurethane containing blends to provide a class of fabric protective compositions which exhibit improved oil and water repellency.

In one aspect, the invention provides a composition for treating fiber-containing substrates to impart improved oil and water repellency thereto, the composition comprising:

(a) A polyalkoxylated polyurethane having pendant perfluoroalkyl groups, said polyalkoxylated polyurethane comprising the reaction product of an aliphatic or aromatic tri- or higher order isocyanate, a fluorinated alcohol, amine, or mercaptan, and a poly(oxyalkylene) diol or dithiol; and (b) A fluorochemical acrylate polymer comprising the reaction product of a fluorinated acrylate or methacrylate monomer, at least one alkyl acrylate or methacrylate monomer, and a polymerizable cationic emulsifier comprising a quaternary amine surfactant.

The compositions preferably also include (c) an alkylene glycol fluoro acrylate polymer comprising the reaction product of a fluorinated acrylate or methacrylate monomer, polyalkylene glycol acrylate or methacrylate, and polyalkylene glycol diacrylate or dimethacrylate. Optionally, (d) a fluorochemical adipate ester can be included in the compositions of the invention. The above components are blended together within the composition at a weight ratio of (a):(b), or (a)+(c):(b), or (a)+(c)+(d):(b) from 25:1 to 1:25 and more preferably, at a 1:1 weight ratio.

The fluorochemical acrylate polymers can be represented by the general formula:

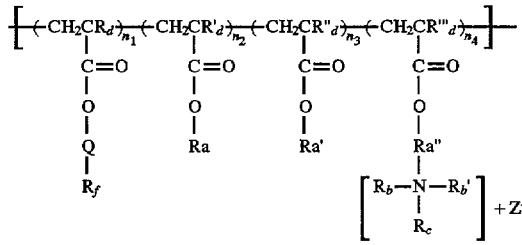

wherein $R_f$ is a fluoroaliphatic radical,

Q is an organic linking group, $R_b$ and $R_b'$ are the same or different and are selected from the group consisting of H and linear or branched hydrocarbons having from 1 to 4 carbon atoms or together forming a carbocyclic ring of from about 3 to about 12 members, and mixtures thereof, $R_d$, $R_d'$, $R_d''$, $R_d'''$ can be the same or different and are selected from the group consisting of H or —$CH_3$, $R_a$, $R_a'$, $R_a''$ can be the same or different and are selected from the group consisting of an alkyl group having from 1 to 18 carbon atoms, $R_c$ is a saturated aliphatic (linear or branched) or cyclic alkyl, or a combination of cyclic and aliphatic alkyls having at least 1 and generally from 4 to 30 carbon atoms, and preferably from 8 to 20 carbon atoms;

Z is an anion selected from the group consisting of chloride, bromide, iodide, sulfonate, alkyl sulfonate, phosphate, and mixtures thereof; $n_1$, $n_2$, and $n_3$ are numbers which may independently range from 10 to 70, and $n_4$ is a number which is at least 1 and generally is within the range from 1 to 6.

Preferably, the compositions of the invention are aqueous emulsions which include only minor amounts of organic solvent. In addition to the above listed ingredients, the compositions may include pH modifiers and corrosion inhibitors. The aqueous compositions of the invention can be provided in aerosol form with the inclusion of an appropriate aerosol propellant such as isobutane, for example.

In the description of the invention, certain terms are used which will be understood to have the meanings defined herein. "Ambient conditions" means at prevailing room temperature and humidity without additional thermal treatment and/or drying equipment. "Fiber-containing substrate" or "substrate" means fabrics, textile fibers or filaments, fabrics made into finished products made from cotton polyester, polyolefin, nylon, acrylic, acetate, leather and blends of the foregoing as well as finished garments, upholstered furniture and carpet. "Polymerizable emulsifier" means a class of quaternized organic salts which serve simultaneously as monomeric reactants and as stabilizing agents in emulsion polymerization. Unless indicated otherwise, "stabilizing agent", "emulsifier" and "surfactant" are identical in meaning and are used interchangeably. In describing acrylate and methacrylate compounds, the term "(meth)acrylate" is intended to indicate both acrylate as well as methacrylate as equally plausible species.

In another aspect, the invention provides a method for treating substrates to provide oil and water repellency comprising treating a substrate with the composition of the invention and drying the treated substrate. In still another aspect, the invention also provides substrates having oil and water repellency when treated with the composition of the invention.

The further details of the invention will be more clearly understood by those skilled in the art after a consideration of the remainder of the disclosure including the detailed description of the preferred embodiment and the appended claims.

DETAILED DESCRIPTION OF THE PREFERRED EMBODIMENT

The fluorochemical compositions of the present invention are water based blends and can be applied to a variety of substrates at ambient conditions to provide a broad range of oil and water repellency properties, as described below. In describing the preferred embodiments of the invention, the individual components in the compositions are discussed and described separately, as indicated.

Alkylene Glycol Fluorochemical Acrylate Polymer

The compositions of the invention may include an alkylene glycol fluorochemical acrylate polymer (or "alkylene glycol fluoro acrylate") comprising the reaction product of a fluorinated acrylate or methacrylate monomer, polyalkylene glycol acrylate or methacrylate monomer and polyalkylene glycol diacrylate or dimethacrylate monomer. The alkylene glycol fluoro acrylates are included within the more preferred embodiments of the invention to enhance the stability of the composition in the presence of minor amounts of coalescent solvents and especially in the presence of corrosion inhibitors added to the composition when formulating an aerosol blend. The alkylene glycol fluoro acrylates also aid in the wetting of a substrate with the compositions of the invention. Fluoro acrylate polymers useful in the present invention are disclosed, for example, in U.S. Pat. No. 5,350,795 (Smith et al.), U.S. Pat. No. 3,787,351 (Olson) and U.S. Pat. No. 4,795,793 (Amimoto et al.), all of which are incorporated herein by reference.

The preferred alkylene glycol fluoro acrylates have randomly arranged repeating units represented as

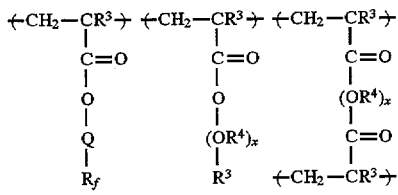

wherein $R_f$ is a fluoroaliphatic radical, $R^3$ is H or $CH_3$, $R^4$ is an alkylene group having 2 to 4 carbon atoms, Q is an organic linking group and x is an integer of at least 5, generally 10 to 75 and can be as high as 100.

The fluoroaliphatic group ($R_f$) is a stable, inert, nonpolar, preferably saturated monovalent moiety which is both oleophobic and hydrophobic. The alkylene glycol fluoro acrylate preferably comprises from 2 to about 25 $R_f$ groups and preferably comprises about 5 percent to about 30 percent, and more preferably about 8 percent to about 20 percent fluorine by weight based on the total weight of the oligomer, with the fluorine being essentially in the $R_f$ groups. $R_f$ preferably contains at least about 3 carbon atoms, more preferably 3 to about 25 carbon atoms, and most preferably about 6 to about 12 carbon atoms. $R_f$ can contain straight chain, branched chain, or cyclic fluorinated alkyl groups or combinations thereof or combinations thereof with straight chain, branched chain, or cyclic alkyl groups. $R_f$ is preferably free of polymerizable olefinic unsaturation and can optionally contain linking heteroatoms such as oxygen, divalent or hexavalent sulfur, or nitrogen. It is preferred that each $R_f$ contain about 40% to about 78% fluorine by weight, more preferably about 50% to about 78% fluorine by weight. The terminal portion of the $R_f$ group contains a fully fluorinated terminal group. This terminal group preferably contains at least 7 fluorine atoms, i.e., $CF_3CF_2CF_2-$, $(CF_3)_2CF-$, $-CF_2SF_5$, or the like. Most preferred $R_f$ are the perfluorinated aliphatic groups, i.e., those of the formula $C_nF_{2n+1}$.

The fluoroaliphatic group, $R_f$, is linked to the ester group by a linking group designated Q. Linking group Q can be a covalent bond, a heteroatom, e.g., O or S, or an organic moiety. Preferably, Q is an organic moiety containing 1 to about 20 carbon atoms, and optionally containing oxygen, nitrogen-, or sulfur-containing groups or a combination thereof, and preferably free of functional groups (e.g., polymerizable olefinic double bonds, thiols, easily abstracted hydrogen atoms such as cumyl hydrogens, and other such functionality known to those skilled in the art) that substantially interfere with free-radical polymerization. Examples of structures suitable for linking group Q include straight chain, branched chain, or cyclic alkylene, arylene, aralkylene, oxy, oxo, thio, sulfonyl, sulfinyl, imino, sulfonamido, carboxamido, carbonyloxy, urethanylene, ureylene, and combinations thereof such as sulfonamidoalkylene. Preferred linking groups Q can be selected according to ease of preparation and commercial availability. Below is a partial representative list of suitable organic Q groups. For the purposes of this list, each k is independently an integer from 1 to about 20, g is an integer from 0 to about 10, h is an integer from 1 to about 20,R' is hydrogen, phenyl, or alkyl of 1 to about 4 carbon atoms, and R" is alkyl of 1 to about 20 carbon atoms.

$-SO_2NR'(CH_2)_k-$
$-CONR'(CH_2)_k-$
$-(CH_2)_kO(O)C-$

—CH$_2$CH(OH)CH$_2$— —CH$_2$CH(OR")CH$_2$—
—(CH$_2$)$_k$C(O)—
—(CH$_2$)$_k$SC(O)—
—(CH$_2$)$_k$O(CH$_2$)$_k$—
—(CH$_2$)$_k$S(CH$_2$)$_k$—
—(CH$_2$)$_k$(OCH$_2$CH$_2$)$_k$—
—(CH$_2$)$_k$SO$_2$(CH$_2$)$_k$—
—SO$_2$NR(CH$_2$)$_k$O(CH$_2$CH$_2$)$_k$—
—(CH$_2$)$_k$SO$_2$NR(CH$_2$)$_k$—
—(CH$_2$)$_k$SO$_2$—
—SO$_2$NR'(CH$_2$)$_k$—
—OC$_6$H$_4$CH$_2$—

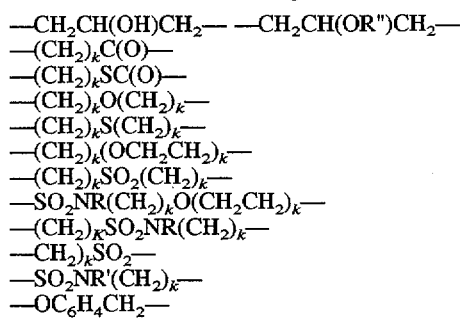

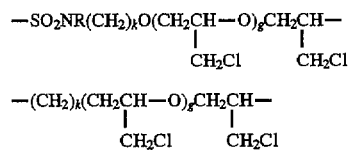

—CH$_2$)$_k$O(CH$_2$CH$_2$O)$_g$CH$_2$CH$_2$—

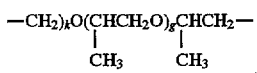

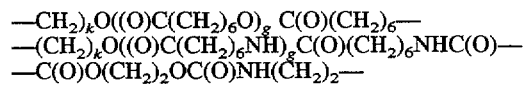

For linking R$_f$, Q is preferably alkylene or sulfonamido, or sulfonamidoalkylene.

In the poly(oxyalkylene) group, (OR$^4$)$_x$, R$^4$ is an alkylene group having 2 to 4 carbon atoms, such as —CH$_2$CH$_2$—, —CH$_2$CH$_2$CH$_2$—, —CH(CH$_3$)CH$_2$—, and —CH(CH$_3$)CH (CH$_3$)—. The oxyalkylene units in the poly(oxyalkylene) may be the same, as in poly(oxypropylene), or may be a mixture, as in a straight or branched chain or randomly distributed oxyethylene and oxypropylene units or as in a straight or branched chain of blocks of oxyethylene units and blocks of oxypropylene units. The poly(oxyalkylene) chain can be interrupted by or include one or more catenary linkages, though it is preferred that such linkages be free of reactive functional groups containing active hydrogen atoms, providing such linkages do not substantially alter the solubility-imparting character of the poly(oxyalkylene) chain. The term "active hydrogen atom" as used in this application means a hydrogen atom (other than an amido hydrogen atom) which leads to chain transfer or chain termination during free radical polymerization. Where the catenary linkages have three or more valences, they provide a means for obtaining a branched chain of oxyalkylene units.

The poly(oxyalkylene) radicals in the oligomers can be the same or different, and they can be pendant. It is also preferred that the molecular weight of the poly(oxyalkylene) radical be between about 500 and 5000 or higher, i.e., 100,000 or more, more preferably 2000 to 4000, in order to obtain a desired solubility.

The alkylene glycol fluoro acrylate polymers can be prepared, or example, by free radical initiated copolymerization of a fluoroaliphatic radical-containing acrylate with a poly(oxyalkylene) monoacrylate, diacrylate or mixtures thereof. The molecular weight of the alkylene glycol fluoro acrylate polymer can be controlled by adjusting the concentration and activity of the initiator, concentration of monomers, and temperature, and by chain-transfer agents, such as thiols, e.g., n-octyl mercaptan. Fluoroaliphatic acrylates, such as those described in the above preparation, are known in the art (e.g., see U.S. Pat. Nos. 2,803,615, 2,642,416, 2,826,564, 3,102,103, 3,282,905, and 3,304, 278). The poly(oxyalkylene)acrylates used in the above preparation, and other acrylates useful for such purposes, can be prepared from commercially available hydroxy and alkoxy poly(oxyalkylene) materials, such as those sold under the trade designations "PLURONIC" (available from BASF Corp. of Parsipanny, N.J.), "CARBOWAX" and "TRITON" (available from Union Carbide Corp), by reacting such hydroxy materials in a known manner with acrylic acid, methacrylic acid, acryloyl chloride, or acrylic anhydride.

Other fluoroaliphatic radical-containing terminally ethylenically unsaturated monomers suitable for the preparation of the polymers of this invention, for example by copolymerizing with corresponding poly(oxyalkylene)-containing, thermally ethylenically unsaturated comonomers, are known in the art (e.g., see U.S. Pat. Nos. 2,592,069, 2,995,542, 3,078,245, 3,081,274, 3,291,843 and 3,325,163, and the ethylenically unsaturated materials suitable for providing fluoroaliphatic radical-containing structural units disclosed in U.S. Pat. No. 3,574,791). The alkylene glycol fluorochemical acrylate polymers may also optionally contain units derived from other monomers such as alkyl acrylates, vinylidene chloride, and n-methylol acrylamide.

A preferred polyethoxylated alkylene glycol fluoro acrylate is a polyoxyethylene terpolymer of

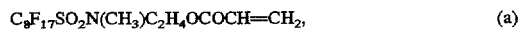 (a)

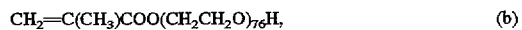 (b)

and

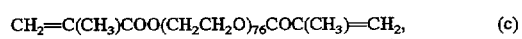 (c)

preferably in a 1:1 weight ratio of a:(b+c) and a 3:1 weight ratio of b:c.

Polyalkoxylated Polyurethane

Compositions according to the present invention will include a polyalkoxylated polyurethane (hereinafter "polyurethane"), preferably having pendant perfluoroalkyl groups and comprising the reaction product of an aliphatic tri- or higher order isocyanate, a fluorinated alcohol, amine or mercaptan, and a poly(oxyalkylene) diol or dithiol. The urethanes useful in the compositions of the invention are commensurate in scope with those disclosed in the aforementioned U.S. Pat. No. 5,350,795 (Smith et al.) and are represented by the formula:

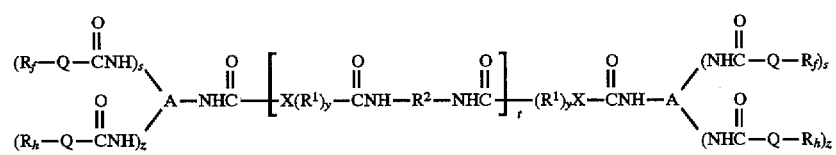

wherein $R_f$ is a fluoroaliphatic radical, $R_h$ is a non-fluorinated hydrocarbon radical, Q is an organic linking group, A is a residue of a tri- or higher order isocyanate, i.e., the residue being that portion of the tri- or higher order isocyanate minus the reacted —NCO groups, $(R^1)_y$ is a poly(oxyalkylene) moiety, $R^1$ being an oxyalkylene group with 2 to 6 carbon atoms or a cyclic ether or ester moiety having 2 to 6 carbon atoms and y is a number of about 10 to 50, X is O, S or a linking group terminating in O or S, (e.g., —$CH_2CH_2O$), $R^2$ is a residue of a tri- or higher order isocyanate, two of the isocyanate groups of the tri- or higher order isocyanate forming the depicted urethane groups and the other isocyanate groups reacted to form pendant —$QR_f$ or —$QR_h$ groups, s is a number of at least 1 and can be 3 or higher, z is zero or a number of up to about 4, s+z is a number of about 4 or higher, and t is a number of at least about 10, preferably 15 to 35.

Generally, the polyalkoxylated polyurethanes have a weight average molecular weight of at least about 40,000, preferably about 65,000 to 250,000.

In the preferred polyurethanes depicted above, there are a plurality of $R_f$ radicals which can be the same or different. This also applies to a plurality of Q, A, $R^1$ and $R^2$ groups. Generally, the polyalkoxylated polyurethanes will contain about 5 to 40 weight percent, preferably about 10 to 30 weight percent, of carbon-bonded fluorine. If the fluorine content is less than about 10 weight percent, impractical large amounts of the polymer will generally be required, while fluorine contents greater than about 35 weight percent generally result in polymers which have too low a solubility to be efficiently used in the compositions of the invention.

The non-fluorinated hydrocarbon group $R_h$, is optionally included within the polyurethanes depicted above. In a preferred embodiment, z is zero (e.g., the polyurethane includes no $R_h$ groups). When present, $R_h$ can be a straight chain, branched chain, or cyclic alkyl. $R_h$ is preferably free of polymerizable olefinic unsatuaration and can optionally contain catenary heteroatoms such as oxygen divalent or hexavalent sulfur, or nitrogen. Also the non-fluorinated hydrocarbon group can optionally contain epoxide or aziridine functionalities. Preferably, the non-fluorinated hydrocarbon group contains about 1 to 36 carbon atoms, more preferably 10 to 24 carbon atoms.

In the poly(oxyalkylene) radical, $R^1_y$, $R^1$ is an oxyalkylene group having 2 to 4 carbon atoms, such as —$OCH_2CH_2$—, —$OCH_2CH_2CH_2$—, —$OCH(CH_3)CH_2$—, and —$OCH(CH_3)CH(CH_3)$—, the oxyalkylene units in the poly(oxyalkylene) may be the same, as in poly(oxypropylene), or they may be different such as in a mixture of straight or branched chain or randomly distributed oxyethylene and oxypropylene units or as in a straight or branched chain of blocks of oxyethylene units and blocks of oxypropylene units. The poly(oxyalkylene) chain can be interrupted by or include one or more catenary linkages which may have three or more valences to provide a means for obtaining a branched chain or oxyalkylene units. The molecular weight of the poly(oxyalkylene) radical can be about 750 to 2000, preferably about 900 to 1750.

$R^2$, which is a residue of a tri- or higher order isocyanate, can be formed from such isocyanate compounds as polyaromatic polyisocyanate ("Papi") such as that available under the trade designation "VORANATE" M220 (available from Dow Chemical Co. of Midland, Mich.) or "DESMODUR" N-100, "DESMODUR" N-3200 and "DESMODUR" N-3300, available from Farbenfabriken Bayer AG of New York, N.Y.

The fluoroaliphatic radical-containing oxyalkylene urethanes used in this invention can be prepared in a known manner such as by condensation homopolymerization or copolymerization using solution, suspension, or bulk polymerization techniques, see e.g., *Preparative Methods of Polymer Chemistry*, Sorenson and Campbell, 2nd ed., Interscience Publishers (1968). Other fluorochemical urethanes can be included in the compositions of the invention, as known by those skilled in the art. Further descriptions of useful fluorochemical oxyalkylenes can be found in U.S. Pat. No. 3,787,351 and U.S. Pat. No. 4,289,892, for example.

Fluorochemical Acrylate Polymers with Polymerizable Emulsifier

The compositions of the invention further include fluorochemical acrylate polymers having copolymerizable surfactants incorporated therein. Preferably, the fluorochemical acrylate polymers comprise the polymerized reaction product of a fluorinated (meth)acrylate monomer; at least one alkyl (meth)acrylate monomer; and a polymerizable cationic emulsifier comprising a quaternary amine surfactant. A preferred fluorochemical acrylate polymer is represented by the general formula $$\left[-(CH_2CR_d)_{n_1}-(CH_2CR'_d)_{n_2}-(CH_2CR''_d)_{n_3}-(CH_2CR'''_d)_{n_4}-\right]$$

with pendant groups:
$C=O$, $C=O$, $C=O$, $C=O$
$|$ $|$ $|$ $|$
$O$ $O$ $O$ $O$
$|$ $|$ $|$ $|$
$Q$ $R_a$ $R_a'$ $R_a''$
$|$
$R_f$ $\left[R_b-N-R_b'\atop |\atop R_c\right]\ +Z^-$ wherein $R_f$ is a fluoroaliphatic radical, as above, Q is an organic linking group, as above, $R_b$ and $R_b'$ are the same or different and are selected from the group consisting of H and linear or branched hydrocarbons having from 1 to 4 carbon atoms or together forming a carbocyclic ring of from about 3 to about 12 members, and mixtures thereof, $R_d$, $R_d'$, $R_d''$, $R_d'''$ can be the same or different and are selected from the group consisting of H or —$CH_3$, $R_a$, $R_a'$, $R_a''$ can be the same or different and are selected from the group consisting of an alkyl group having from 1 to 18 carbon atoms, $R_c$ is a saturated aliphatic (linear or branched) or cyclic alkyl, or a combination of cyclic and aliphatic alkyls having at least 1 and generally from 4 to 30 carbon atoms, and preferably from 8 to 20 carbon atoms;

Z is an anion selected from the group consisting of chloride, bromide, iodide, sulfonate, alkyl sulfonate, phosphate, and mixtures thereof;

$n_1$, $n_2$, and $n_3$ are numbers which may independently range from 10 to 70, and $n_4$ is a number which is at least 1 and generally is within the range from 1 to 6.

As mentioned, $R_d$, $R_d'$, $R_d''$, $R_d'''$ can be the same or different and are selected from the group consisting of H or —$CH_3$, so that the acrylate and the methacrylate species are equally plausible for use as monomers in the above fluorochemical acrylate polymers. Suitable fluorinated (meth)

acrylate monomers useful in the invention are those selected from the group consisting of N-methyl perfluoro octylsulfonamidoethyl (meth)acrylate, N-ethyl perfluoro octylsulfonamidoethyl (meth)acrylate, and the like. Most preferably, the fluorinated (meth)acrylate monomer is N-methyl perfluoro octylsulfonamidoethyl acrylate. Of the total polymerizable species present in the final copolymer, the fluorinated (meth)acrylate monomer comprises from about 15 to about 40 mole percent, and, more preferably, between 20 and 30 mole percent of the total polymerizable species present in the final copolymer.

The fluorochemical acrylate polymer is made with at least one alkyl (meth)acrylate monomer. Preferably, two alkyl (meth)acrylate monomers are used in the preparation of the above polymer. Suitable alkyl (meth)acrylate monomers are alkyl esters of acrylic or methacrylic acid wherein the alkyl groups, $R_a$ or $R_a'$, are independently selected from the group of $C_1$ to $C_{18}$ alkyls which may be linear, branched, cyclic or polycyclic, within the above parameters. Preferred alkyl (meth)acrylates are selected from the group consisting of methylacrylate, ethylacrylate, butylacrylate, hexylacrylate, isooctylacrylate, isodecylacrylate, octadecylacrylate ethylmethacrylate, butylmethacrylate, cyclohexylmethacrylate and mixtures thereof. More preferably, the alkyl (meth) acrylate monomers comprise an alkyl acrylate and an alkyl methacrylate and, most preferably are n-butyl acrylate and n-butyl methacrylate.

The polymerizable cationic emulsifier comprises a quaternary amine surfactant capable of entering into free radical polymerization reactions with one or more of the monomers used to synthesize the fluorochemical acrylate polymer. Most preferably, the emulsifiers contain at least one carbon-carbon double bond situated so that the double bond is capable of entering into free radical polymerization reactions (e.g., the double bond is not stearically or electronically hindered).

Most preferably, the copolymerizable cationic emulsifiers are quaternary ammonium salts of of alkyl acrylates of the general formula

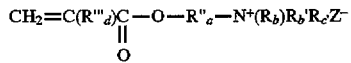

wherein $R_a''$, $R_b$, $R_b'$, $R_c$, $R_d'''$, and Z, are as described above.

Most preferably, the cationic copolymerizable emulsifier comprises the reaction product of N,N-dimethylaminoethyl methacrylate and an alkyl halide having a carbon chain length from about 4 to about 30 carbon atoms and, more preferably, from about 8 to about 20 carbon atoms. A preferred alkyl halide is hexadecylbromide because of its commercial availability as well as its ease of use in making emulsified polymers. Other quaternary salts of the above formula are described in U.S. Pat. Nos. 3,780,092; 3,928, 423; 3,936,492 and 4,001,259, the disclosures of which are incorporated by reference herein. The cationic copolymerizable emulsifier preferably comprises from about 0.5 percent to about 10 percent based on the total weight of the other monomers present in the fluorochemical acrylate polymer, and most preferably, from about 2 to about 6 percent.

The quaternary ammonium salt can be prepared first by reacting N,N-dimethylaminoethyl methacrylate and an alkyl halide according to the General Preparative Procedure A herein. The emulsifier and the other monomers are then emulsion polymerized. Water, the fluorinated monomer(s) the alkyl (meth)acrylate monomer(s) and the surfactant are homogenized in a known manner at elevated temperatures (e.g., 55° to 70° C.). Next, the emulsion is treated a suitable water soluble free-radical initiator under a nitrogen blanket. The initiator is preferably added to the emulsion to provide a concentration of initiator of between about 0.05% to 2% and preferably 0.1 to 0.5% by weight based on the total weight of the monomers in the emulsion. The selection of a suitable a initiator is within the skill of those practicing in the field. Suitable initiators include 2,2'-azobis-(2-cyanopropane-1-sulfonate), 2,2'-azobis-(2-amidinopropane) dihydrochloride, α,α-azobis-butyramidinium chloride, and azobis-(N,N'-dimethylene isobutyramidine) and its salts with strong acids and mixtures thereof. A preferred water soluble initiator is 2,2'-azobis-(2-amidinopropane) dihydrochloride, available under the trade designation "V-50" from Wako Chemicals U.S.A., Inc. of Richmond, Va. The resulting polymeric emulsion may be diluted with water prior to blending the polymer with the other components in the compositions of the invention, as is further described below.

Fluorochemical Esters

Optionally, fluorochemical esters may be included within the compositions of the invention. The esters useful in the compositions of the invention are commensurate in scope with those disclosed in the aforementioned U.S. Pat. No. 5,350,795. These esters may be included within the compositions to help maintain a high level of repellency for the treated fabric after the fabric is abraded, for example. In the absence of esters in the compositions of the invention, the treated substrates may experience somewhat diminished repellency after being subjected to conditions of abrasion, but the compositions are still useful in the treatment of substrates, as described herein. Fluorochemical esters useful in the present invention can be formed by reacting a perfluoroalkyl aliphatic alcohol or mixture of alcohols with mono- or polycarboxylic acids which can contain other substituents and which contain from 3 to 30 carbon atoms. Optionally a mixture of perfluoroalkyl aliphatic alcohol and hydrocarbon alcohols can be esterified with the polycarboxylic acids. Such esters are described, for example, in U.S. Pat. No. 4,029,585 (Dettre et al.).

A particularly preferred fluorochemical ester is the fluorochemical adipate ester which represented by the formula

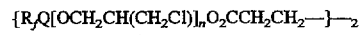

wherein $R_f$ and Q are as defined above and n is a number from about 1 to 5, preferably 1 to 3.

The fluorochemical adipate ester can be prepared by reacting a precursor fluoroaliphatic radical- and chlorine-containing alcohol with adipic acid. A most preferred ester is represented by the formula

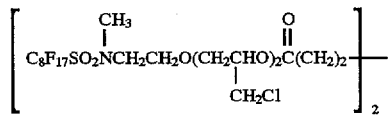

A method of preparing the alcohol precursors is by reaction of epichlorohydrin with a fluoroaliphatic radical-containing alcohol. Readily available alcohols which can be used in this preparation are those corresponding to the formula

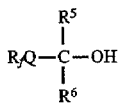

wherein

R_f and Q are as defined above, $R^5$ is hydrogen or a lower alkyl, and $R^6$ is hydrogen, lower alkyl, or aryl of 6 to 12 carbons and $R^5$ and $R^6$ can be connected together to form a cyclic structure, aromatic or cycloaliphatic, including the hydroxyl-bearing carbon atom. When the fluoroaliphatic radical-containing alcohols are reacted with epichlorohydrin to form the corresponding fluoroaliphatic alcohols, the latter can correspond to the formula

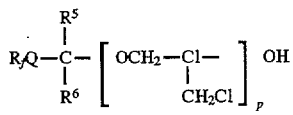

where $R_f$, Q, $R_1$ and $R_2$ are as defined above and p is an integer from 1 to 5.

Representative species of fluoroaliphatic compounds containing epoxy-reactive hydrogen atoms which can be used to make the corresponding fluoroaliphatic radical- and chlorine-containing alcohols are those disclosed, for example, in U.S. Pat. No. 4,043,823 (Loudas) and U.S. Pat. No. 4,289,892 (Soch).

Suitable fluorochemical adipate esters are disclosed in U.S. Pat. No. 4,264,484 (Patel) which is incorporated herein by reference.

Preferred Compositions

The compositions of the invention comprise a blend of the above described ingredients and the preparation of such blends is set forth in detail in the General Preparative Procedures and in the Examples herein. In general, the compositions of the present invention comprise a blend of first and second major components wherein the first major component comprises polyalkoxylated polyurethane, preferably with polyalkylene glycol fluorochemical acrylate copolymer and, optionally including a fluorochemical adipate ester, all as described above. The second major component comprises fluorochemical acrylate polymer with the polymerizable cationic emulsifier, also as described above.

Regarding the first major component, the polyurethane, in aqueous emulsion, can be used alone and may be prepared following the General Preparative Procedure B herein (e.g., about 15% solids), allowing for changes in the monomers and the substituent groups according to the parameters set forth above. The alkylene glycol fluoro acrylate may be prepared according to the General Preparative Procedure C, allowing for changes in the monomers and the substituent groups according to the parameters set forth above. The alkylene glycol fluoro acrylate is blended with the polyurethane to provide a weight ratio of polyurethane:alkylene glycol fluoro acrylate of about 3:2. Where the optional adipate ester is included within the first major component, the polyurethane, the alkylene glycol fluoro acrylate and the ester are blended in deionized water, stirred to promote thorough mixing and excess solvent is stripped from the mixture to give a blend which is preferably from about 5% to about 20% solids in water and more preferably between 10% and 16%. Preferably, the polyurethane is present within the first component at a weight percent of between about 50% and 90% and most preferably about 50%. The alkylene glycol fluoro acrylate may be present at a weight percent of 10% to 50% and most preferably about 33%. The optional adipate ester is generally present at a weight percent of 10% to 20% and most preferably about 17%.

Regarding the second major component, the fluorochemical acrylate polymer is made as an aqueous emulsion and generally following the General Preparative Procedure A while allowing for changes of the monomers and the substituent groups according to the general parameters set forth herein. The two major components are blended in deionized water to achieve a preferred solids content of about 3 percent by weight and a solids weight ratio between the two components ranging from about 25:1 and 1:25 and more preferably from 9:1 to 1:9. Most preferably, the two major components are blended to achieve a solids weight ratio of about 1:1 in the finished composition.

Minor amounts of coalescing solvents are then added along with minor amounts of other solvent (e.g., alcohol) to increase fabric wetting, improve the stability of the composition and reduce the likelihood of residue formation on the treated substrate. Aerosol propellants such as isobutane and the like are used in packaging the compositions in aerosol form. Likewise, known corrosion inhibitors are preferably included within such aerosol products to prevent corrosion within the steel cans normally used to package such products.

Suitable coalescing solvents include the alkylene glycol ethers such as dipropylene glycol mono n-butyl ether, propylene glycol mono methyl ether, dipropylene glycol mono n-propyl ether, esters thereof and mixtures of the foregoing. Assuming a preferred solids concentration in the composition of about 3%, The coalescing solvents are present within the composition at a total weight percentage from about 2% to 10% and preferably about 4%. A small amount of an of an alkylol such as ethyl alcohol or isopropanol may be added to as an additional solvent as an aid to the stability of the composition and to prevent freezing. Preferably, the alcohol is present at a weight percent in the finished composition of between about 0.5% and 3% and most preferably 1%. The selection of suitable solvents and their relative concentrations within the composition is within the skill of those practicing in the field. Suitable corrosion inhibitors include morpholine, ammonium hydroxide (30%), sodium nitrite, alkyl amines and combinations thereof. The concentrations of corrosion inhibitors is typically less than 1% by weight and most preferably is between about 0.5% and 1.0%, assuming a solids concentration in the composition of about 3%.

A fast-breaking foam composition can be formulated with the addition of pH modifiers to the aerosol formulation mentioned above. A foam product may be desirable to enable the user of the composition to easily see where a treatment has been applied to thereby avoid over application of the composition as well as increased drying times.

Anti-soiling agents may also be added to the compositions of the invention. Such agents are defined as materials which are solid, non-tacky water soluble or water dispersible and which, upon drying of the composition, are capable of rendering the substrate non-tacky and resistant to soiling. The inclusion of the anti-soiling agents within the compositions of the invention is optional.

The compositions described herein may be applied to a wide variety of fiber-containing substrates. These substrates include textile fibers (or filaments) and fabrics, (including fabrics made into finished products) made from cotton, polyester, polyolefin, nylon, acrylic, acetate or blends thereof, as well as leather, finished garments, upholstered furniture and installed carpet. Individual fibers or filaments can be treated with the compositions of the invention as well as aggregate forms of such filaments or fibers (e.g., yarn, tow, web as well as woven or knit fabric). These substrates can be treated with the compositions of the invention by applying the compositions thereto using known techniques customarily used in applying fluorochemicals to fibers and fabrics. These compositions can be applied to finished products such as apparel and upholstered furniture without the need for thermal curing and will provide excellent oil and water repellency without the inclusion of significant amounts of organic solvents. Suitable application techniques for applying these compositions include, for example, spraying, brushing, immersion or foaming. The amount of the compositions applied to the substrate is typically about 0.5 to 6 weight % solids and, more preferably, 1 to 4 weight % solids based on the weight of the fiber or fabric.

Test Methods

In the examples which follow, treated substrates are tested for oil and water repellency according to the following test methods.

Oil Repellency

The oil repellency of treated substrates is measured by the American Association of Textile Chemists and Colorists (AATCC) Test Method No. 118-1966. This test gives a relative value of the oily stain resistance for the substrate being tested. Drops of different test liquids are gently placed on the substrate and are allowed to remain for 30 seconds. The drops are then removed from the substrate by wicking or wiping with a paper tissue and the substrate is observed for remaining signs of wetting. Eight different oil challenge liquids are used with the number 1 liquid ("Nujol" mineral oil) being the easiest to repel and the number 8 liquid (n-Heptane) being the most difficult. The various test liquids are shown in Table 1 below. The substrate are tested in a systematic manner starting with the first liquid and progressing to the other liquids until one of the liquids is observed to wet the substrate after 30 seconds. Oil repellency is reported as the number value of the highest numbered liquid which did not wet the substrate. For detailed comparisons, multiple drops of each liquid are tested and whole numbers and fractions may be reported. In general, an oil repellency rating of 5 or higher is desired.

TABLE 1

| AATCC TM-118-1966 | |
|---|---|
| Oil Repellency Rating | Test Liquid |
| 8 | n-Heptane |
| 7 | n-Octane |
| 6 | n-Decane |
| 5 | n-Dodecane |
| 4 | n-Tetradecane |
| 3 | n-Hexadecane |
| 2 | 35/65 mix of n-Hexadecane/Nujol |
| 1 | Nujol (mineral oil) |

Abraded Oil Repellency

The abraded oil repellency test also provides a relative value of the substrates' oily stain resistance. In this test method, however, the treated substrate is first placed on an ATTCC Crockmeter (as used in AATCC Test Method 8-1985 and commercially available from Atlas Electric Devices Co. of Chicago, Ill.) and subjected to 20 cycles of rubbing abrasion using a 1.6 centimeter disk of grade 600 abrasive paper (available under the trade designation "Wetordry Tri-M-ite" from Minnesota Mining and Manufacturing Company of St. Paul, Minn.). After being abraded, the test substrate is treated in the same manner as in the oil repellency test described above using the same test oils. In general, an oil repellency of 4 or greater is desirable.

Water/Alcohol Drop Repellency

The water/alcohol drop repellency test tests the ability of the substrate to repel various blends of water and isopropyl alcohol. Test drops of the liquid solutions are progressively applied to the treated substrate and, after 30 seconds, if the applied solution does not soak into the substrate, the solution is wicked or wiped away with a paper tissue and the surface of the substrate is observed for surface wetting. Eleven blends of water and alcohol are used (see table 2, below) with 100% water being the easiest to repel and 100% isopropyl alcohol being the most difficult. The treated substrate is given a number value corresponding to the solution having the highest concentration of isopropyl alcohol which the treated substrate was able to repel without observed wetting. For example, a substrate is given a value of 4 if it is able to repel the solution of 60% water and 40% isopropyl alcohol.

TABLE 2

| Test liquids - by volume at 21° C. (70° F.). | |
|---|---|
| Solution | Composition of Test Liquid (wt. %) |
| W | 100 Water |
| 1 | 90/10 Water/Isopropyl Alcohol |
| 2 | 80/20 Water/Isopropyl Alcohol |
| 3 | 70/30 Water/Isopropyl Alcohol |
| 4 | 60/40 Water/Isopropyl Alcohol |
| 5 | 50/50 Water/Isopropyl Alcohol |
| 6 | 40/60 Water/Isopropyl Alcohol |
| 7 | 30/70 Water/Isopropyl Alcohol |
| 8 | 20/80 Water/Isopropyl Alcohol |
| 9 | 10/90 Water/Isopropyl Alcohol |
| 10 | 100 Isopropyl Alcohol |

Water Spray Test

The water spray test follows AATCC Test Method 22. The treated substrate is rated for water repellency as determined by the pattern of surface wetting described in table 3 below. During the test, the treated substrate is held taut within a 15-centimeter diameter ring at a 45° angle. 250 milliliters of water at a temperature of 27° C. (±1° C.) is dropped onto the substrate from a distance of 15.2 centimeters above the center of the substrate. After the application of water, the substrate is tapped lightly to remove excess water and is rated in a manner consistent with that shown in table 3. A higher number indicates better water repellency and, in general, a number of 65 or higher is desirable.

TABLE 3

| Rating | Degree of Water Repellency |
|---|---|
| 100 | No wetting of the surface |
| 90 | Wetting of the surface in a few small spots |
| 80 | Wetting of the surface in 6–15 separate spots |
| 70 | Wetting of the surface by connected spots |
| 50 | Full wetting of surface in center of fabric |
| 0 | Complete wetting of entire fabric surface |

Wet-Through Rating

The wet-through rating is performed on a treated substrate immediately following the water spray test, described above.

The treated substrate which was rated in the above water spray test is immediately turned over and the back side of the substrate is visually observed and is touched by the observer to determine whether water has seeped through. A wet-through value from 1 to 6 is then given to the treated substrate, depending on the degree of "wetness." A value of "1" signifies the back of the substrate is thoroughly wet, while a value of "6" indicates the substrate is completely dry.

Composite Repellency Rating

A composite repellency rating is tabulated for each composition on each substrate by summing the values obtained in each of the above test methods with the exception that the rating obtained in the water spray test is first divided by 10. The maximum composite repellency rating possible is 42.

General Preparative Procedure A

Fluorochemical Acrylate Polymer With Polymerizable Cationic Emulsifier

A reaction vessel fitted with a condenser, a mechanical stirer, and a thermometer is charged with 9.0 grams of N,N-dimethylaminoethyl methacrylate (available from Aldrich Chemicals of Milwaukee, Wis.), 0.036 grams of butylated hydroxy toluene (BHT) (Aldrich Chemicals), 18.8 grams acetone and 17.5 grams 1-bromohexadecane (Aldrich Chemicals) The mixture is heated at 75° C. (165°–170° F.) until the unreacted amine is below 0.05%, as determined by gas chromatography. The reaction solution is then cooled and the formation of a precipitate is observed. 18.1 grams ethylacetate (Aldrich Chemicals) is then added to the reaction solution and the solution is cooled to 16° C. (60° F.). A white solid (2-(dimethyl hexadecylamino)ethylmethacrylate bromide) precipitates from the solution and the solid is filtered and washed twice with cold ethyl acetate and is dried in a vacuum oven at 50° C. for 8 hours.

In a suitable flask quipped with a mechanical stir and a thermometer, a mixture of 139.46 grams deionized water and 2.34 grams of the 2-(dimethyl hexadecylamino) ethylmethacrylate bromide is emulsified using a lab homogenizer (e.g., model HC-8000 available from Microfluidics Corp. of Newton, Mass.) at 60° C. for about 10 minutes. To a 16 ounce (0.47 liter) amber bottle, 34.86 grams N-methyl perfluorooctylsulfonamidoethyl acrylate (available from Minnesota Mining and Manufacturing Company of St. Paul, Minn.), 17.40 grams butylacrylate (Aldrich Chemicals), and 5.86 grams butylmethacrylate (Aldrich Chemicals) are added. The bottle is capped and the mixture is warmed to 60° C. with gentle agitation. The mixture is slowly added to the homogenizing bromide salt solution and the resulting emulsion is passed through the lab homogenizer twice. The emulsion is transferred to a 16 ounce (0.47 liter) amber bottle and is treated with 0.06 grams of a free radical initiator, 2,2'-azobis-(2-amidinopropane)dihydrochloride ("V-50" from Wako Chemicals U.S.A., Inc.), and nitrogen is bubbled through the emulsion for 1 minute. The bottle is capped and kept at 60° C. while mixing at about 50 rpm in a launderometer for 5 hours. The resulting latex (about 30% solids) is cooled, filtered and is then ready for use in the formulations below.

General Preparative Procedure B

Polyurethane 1.062 grams (1.8 moles) of N-methyl perfluorooctane-sulfonamidoethyl alcohol and 708 grams ethyl acetate (available from Mallinckrodt, Inc. of Paris, Ky.) are added to a 5-1liter, 3-necked flask equipped with a mechanical stirrer, thermometer, reflux condenser, nitrogen inlet tube and heating mantle. After heating with stirring to about 55° C. under a nitrogen atmosphere, a premixed solution of 616 grams (1.08 moles) of a trifunctional isocyanate ("DESMODUR" N-100 from Farbenfabriken Bayer AG) and 300 grams ethyl acetate is added. Next, 0.84 gram stannous octoate (Sigma Chemical Co. of St. Louis, Mo.) is added and the reaction mixture is stirred at about 75° C. for about six hours. A premixed solution of 1,044 gram (0.72 moles) of an alkoxy-polyethylene glycol (available under the trade designation "CARBOWAX" 1450 from Union Carbide) and 807 grams ethyl acetate is added. The resulting mixture is stirred and heated at reflux (about 83° C.) for about 16 hours. 150 grams of the thus prepared polyurethane solution is added to a 1-liter, 3-necked flask equipped with a mechanical stirrer, dropping funnel, thermometer and a heating mantle and heated to 65° C. Distilled water (510 grams) heated to 65° C. is slowly added with vigorous stirring. The resulting mixture is stirred for 10 minutes and ethyl acetate is removed by vacuum stripping to provide a translucent dispersion of about 15% solids.

General Preparative Procedure C

Alkylene glycol fluoroacrylate

A poly (oxyalkalene)acrylate solution is first prepared by adding 120 grams toluene, 90 grams of a difunctional block-polymer with terminal hydroxyl groups (available under the trade designation "PLURONIC" 44 from BASF Company of Parsippany, N.J.), 0.05 grams phenothiazine (Aldrich Chemicals), 4.45 grams acrylic acid (Aldrich Chemicals ) and 1 gram p-toluene sulphonic acid (Aldrich Chemicals) are added to a glass reactor fined for stirring, heating, cooling and reflux. The contents of the reactor are heated to reflux at 110°–120° C. with stirring until the acid content is constant. The contents of the reactor are then cooled to 50° C. and neutralized with 2 grams powdered calcium hydroxide and the contents are stirred further for about 0.5 hours. 90 grams of the foregoing poly (oxyalkalene)acrylate solution are added to a glass reactor fitted for stirring, vacuum, nitrogen inlet, heating, cooling, and distillation along with 120 grams toluene and 36 grams N-butylperfluorooctane-sulfonamidoethyl acrylate (Minnesota Mining and Manufacturing Company). The contents of the reactor are heated with stirring at 55° C. for 0.5 hour and then 6 grams n-octyl mercaptan (Aldrich Chemicals), chain transfer agent, and 0.9 gram tertiary butylhydroperoxide promoter (t-$C_4H_9$OOH) (Aldrich Chemicals) are added. The reactor is purged of oxygen by evacuation and repressurized with nitrogen. The contents are then stirred for 65° C. for about 16 hours. Solvent is then removed from the reactor under vacuum (1 hour at 95° C. at a pressure of about 200 mm mercury).

General Preparative Procedure D

Adipate ester

In a glass flask fitted with an addition funnel, condenser, stirrer, heating mantle and thermometer are place 670 grams alcohol (made according to Example 2 of U.S. Pat. No. 4,264,484), 73 grams adipic acid and 480 grams toluene. The contents of the flask are heated slowly with stirring to about 80° C. and 2.2 grams concentrated sulfuric acid are then added. The reaction mixture is heated to reflux. Water is then removed by using a modified dean-stark trap. After 16 hours of reflux, the reaction is complete. Toluene is then removed by distillation at atmospheric pressure leaving 691 grams of residual product, a light tan, solid melting at 64°–82° C.

General Preparative Procedure E

Blending Components Made According To Procedures B, C, and D

To a 2-liter, 3-necked flask equipped with an overhead stirrer, a thermometer and a reflux condenser are added 184.6 grams of the polyurethane reaction mixture (in ethyl acetate and before adding water), as in General Preparative Procedure B, 178.7 grams of acrylate copolymer made according to General Preparative Procedure C, 36 grams fluorochemical adipate ester made according to General Preparative Procedure D, 125 grams ethyl acetate and 960 grams deionized water. The resulting mixture is vigorously stirred for 1 hour while be heated to 65°–70° C. Solvent is removed by vacuum stripping and about 750 grams of water is added as necessary to make a stable dispersion of about 12% solids.

General Preparative Procedure F

Blending Components Made According To Procedures B and C

To a 500 liter 3-necked flask equipped with an overhead stirrer, a thermometer and a reflux condenser is added 27.5 grams of the polyurethane reaction mixture (in ethyl acetate and before adding water), as in General Preparative Procedure B, 25.0 grams of acrylate copolymer made according to the above General Preparative Procedure C and 144 grams deionized water. The resulting mixture is vigorously stirred for 60 minutes while being heated at 70° C. The solvent is removed by vacuum stripping to give a stable dispersion of about 14% solids.

General Preparative Procedure G

To a 16 oz.(0.47 liter) amber bottle, 36 grams of N-methylperfluorooctyl-sulfonamidoethyl acrylate (Minnesota Mining and Manufacturing Company), 18 grams of butyl acrylate, 6 grams of butyl methacrylate, 28 grams ethanol, 112 grams deionized water and 3 grams of methylpolyoxyethylene (15) octadecyl ammonium chloride cationic surfactant (available under the trade designation "ETHOQUAD" 18/25 from Akzo Chemicals of Chicago, Ill.) are added. The mixture is warmed to 60° C. in a launderometer. To the warmed mixture, 0.06 grams of free radical initiator, 2,2'-azobis-(2-amidinopropane) dihydrochloride ("V-50" from Wako Chemicals U.S.A., Inc.), is added and nitrogen is bubbled through the mixture for one minute. The bottle is capped and kept at 60° C. while mixing it in a launderometer for 5 hours. The resulting latex is filtered and can be used in the comparative examples herein.

The following Examples illustrate the preparation and the comparative advantages of the compositions of the present invention. The materials and amounts thereof, as well as other conditions and details, recited in the Examples are not to be construed as unduly limiting. All percentages are by weight unless otherwise indicated.

EXAMPLES

Example 1

In a 200 ml flask equipped with a mechanical stir, 78 grams deionized water, 5.0 grams of the fluorochemical acrylate polymer emulsion made according to the above Procedure A, 12.5 grams of a blend made according to the above Procedure E were blended under constant stirring. 2.5 grams dipropylene glycol mono-n-butyl ether, 1.0 gram propylene glycol mono methyl ether and 1.0 gram ethanol were then added to the flask while constantly stirring. The resulting solution comprised about 3% solids and the weight ratio of the fluorochemical acrylate polymer:[polyurethane+ polyalkylene glycol fluorochemical acrylate copolymer+ adipate ester] was about 1:1.

Example 2

Another composition was made as in Example 1, except that 0.5 grams of the fluorochemical acrylate polymer, 23.8 grams of a blend made according to the above Procedure E and 71.2 grams deionized water were used to formulate a blend having a weight ratio of the fluorochemical acrylate polymer:[polyurethane+polyalkylene glycol fluorochemical acrylate copolymer+adipate ester] of about 1:19.

Example 3

Another composition was made as in Example 1, except that 1.0 grams of the fluorochemical acrylate polymer, 22.5 grams of a blend made according to the above Procedure E and 72 grams deionized water were used to formulate a blend having a weight ratio of the fluorochemical acrylate polymer:[polyurethane+polyalkylene glycol fluorochemical acrylate copolymer+adipate ester] of about 1:9.

Example 4

Another composition was made as in Example 1, except that 9.0 grams of the fluorochemical acrylate polymer, 2.5 grams of a blend made according to the above Procedure E and 84 grams deionized water were used to formulate a blend having a weight ratio of the fluorochemical acrylate polymer:[polyurethane+polyalkylene glycol fluorochemical acrylate copolymer+adipate ester] of about 9:1.

Example 5

Another composition was made as in Example 1, except that 9.5 grams of the fluorochemical acrylate polymer, 1.25 grams of a blend made according to the above Procedure E and 84.75 grams deionized water were used to formulate a blend having a weight ratio of the fluorochemical acrylate polymer:[polyurethane+polyalkylene glycol fluorochemical acrylate copolymer+adipate ester] of about 19:1.

Example 6

Another composition was made as in Example 1, except that 1.7 grams of the fluorochemical acrylate polymer, 4.2 grams of a blend made according to the above Procedure E and 89.6 grams deionized water were used to formulate a blend comprising about 1% solids. The weight ratio of the fluorochemical acrylate polymer:[polyurethane+ polyalkylene glycol fluorochemical acrylate copolymer+ adipate ester] was about 1:1.

Example 7

Another composition was made as in Example 1, except that 10 grams of the fluorochemical acrylate polymer, 25 grams of a blend made according to the above Procedure E and 60.5 grams deionized water were used to formulate a blend comprising about 6% solids. The weight ratio of the fluorochemical acrylate polymer:[polyurethane+ polyalkylene glycol fluorochemical acrylate copolymer+ adipate ester] was about 1:1.

Example 8

A fluorochemical acrylate polymer was made according to the above Procedure A except that the bromide salt monomer was substituted with 3.12 grams of a 75% solids solution of 2-(trimethyl-amino)ethylmethacrylate chloride salt in water. 78.0 grams deionized water, 5.0 grams of the fluorochemical acrylate polymer and 12.5 grams of a blend made according to the above Procedure E were blended under constant stirring. 2.5 grams dipropylene glycol mono-n-butyl ether, 1.0 gram propylene glycol mono methyl ether and 1.0 gram ethanol were then added to the flask while constantly stirring. The resulting solution comprised about 3% solids and the weight ratio of the fluorochemical acrylate polymer: [polyurethane+polyalkylene glycol fluorochemical acrylate copolymer+adipate ester] was about 1:1.

Example 9

A fluorochemical acrylate polymer was made according to the above Procedure A except that bromodocosane replaced the bromohexadecane to make 2-(dimethyldocosaneamino) ethylmethacrylate bromide salt. As in Example 1, 78.0 grams deionized water, 5.0 grams of the fluorochemical acrylate polymer and 12.5 grams of a blend made according to the above Procedure E were blended under constant stirring. 2.5 grams dipropylene glycol mono-n-butyl ether. 1.0 gram propylene glycol mono methyl ether and 1.0 gram ethanol were then added to the flask while constantly stirring. The resulting solution comprised about 3% solids and the weight ratio of the fluorochemical acrylate polymer: [polyurethane+polyalkylene glycol fluorochemical acrylate copolymer+adipate ester] was about 1:1.

Example 10

A fluorochemical acrylate polymer was made according to the above Procedure A except that the butyl acrylate and butyl methacrylate were substituted with 23.26 grams of methyl acrylate. As in Example 1, 78.0 grams deionized water, 5.0 grams of the fluorochemical acrylate polymer and 12.5 grams of a blend made according to the above Procedure E were blended under constant stirring. 2.5 grams dipropylene glycol mono-n-butyl ether, 1.0 gram propylene glycol mono methyl ether and 1.0 gram ethanol were then added to the flask while constantly stirring. The resulting solution comprised about 3% solids and the weight ratio of the fluorochemical acrylate polymer:[polyurethane+ polyalkylene glycol fluorochemical acrylate copolymer+ adipate ester] was about 1:1.

Example 11

A fluorochemical acrylate polymer was made according to the above Procedure A except that the butyl acrylate and butyl methacrylate were substituted with 23.26 grams of octadecyl acrylate. As in Example 1, 78.0 grams deionized water, 5.0 grams of the fluorochemical acrylate polymer and 12.5 grams of a blend made according to the above Procedure E were blended under constant stirring. 2.5 grams dipropylene glycol mono-n-butyl ether, 1.0 gram propylene glycol mono methyl ether and 1.0 gram ethanol were then added to the flask while constantly stirring. The resulting solution comprised about 3% solids and the weight ratio of the fluorochemical acrylate polymer:[polyurethane+ polyalkylene glycol fluorochemical acrylate copolymer+ adipate ester] was about 1:1.

Example 12

In a 200 ml flask equipped with a mechanical stir, 80.5 grams deionized water, 5.0 grams of the fluorochemical acrylate polymer made according to the above Procedure A and 10 grams of a polyurethane emulsion made according to the above Procedure B were blended under constant stirring. 2.5 grams dipropylene glycol mono-n-butyl ether, 1.0 gram propylene glycol mono methyl ether and 1.0 gram ethanol were then added to the flask while constantly stirring. The resulting solution comprised about 3% solids and the weight ratio of the fluorochemical acrylate polymer:polyurethane was about 1:1.

Example 13

In a 200 ml flask equipped with a mechanical stir, 80.5 grams deionized water, 5.0 grams of the fluorochemical acrylate polymer made according to the above Procedure A and 10 grams of a polyurethane/acrylate polymer blend made according to the above Procedure F were blended under constant stirring. 2.5 grams dipropylene glycol mono-n-butyl ether, 1.0 gram propylene glycol mono methyl ether and 1.0 gram ethanol were then added to the flask while constantly stirring. The resulting solution comprised about 3% solids and the weight ratio of the fluorochemical acrylate polymer:[polyurethane+polyalkylene glycol fluorochemical acrylate copolymer] was about 1:1.

Example 14

A fluorochemical acrylate polymer was made according to the above Procedure A except that the butyl acrylate and butyl methacrylate were substituted with 23.26 grams of methyl acrylate. 81.7 grams deionized water. 6.7 grams of the fluorochemical acrylate polymer and 7.1 grams of a polyurethane/acrylate polymer blend made according to the above Procedure F were blended under constant stirring. 2.5 grams dipropylene glycol mono-n-butyl ether, 1.0 gram propylene glycol mono methyl ether and 1.0 gram ethanol were then added to the flask while constantly stirring. The resulting solution comprised about 3% solids and the weight ratio of the fluorochemical acrylate polymer:[polyurethane+ polyalkylene glycol fluorochemical acrylate copolymer] was about 2:1.

Example 15

Another composition was prepared as in Example 13 except that 81.7 grams deionized water, 6.7 grams of the fluorochemical acrylate polymer made according to the above Procedure A and 7.1 grams of a polyurethane/acrylate polymer blend made according to the above Procedure F were used. The resulting solution comprised about 3% solids and the weight ratio of the fluorochemical acrylate polymer: [polyurethane+polyalkylene glycol fluorochemical acrylate copolymer] was about 2:1.

Example 16

A polyurethane polymer was prepared according to the above Procedure B except that a propylene oxide, ethylene oxide copolymer available under the trade designation "Pluronic" L62 (from BASF Corporation of Parsippany, N.J.) was used in place of the ethylene glycol ("Carbowax" 1450). In a 200 ml flask equipped with a mechanical stir, 80.5 grams deionized water, 5.0 grams of the fluorochemical acrylate polymer made according to the above Procedure A and 10 grams of the polyurethane were blended under constant stirring. 2.5 grams dipropylene glycol mono-n- butyl ether, 1.0 gram propylene glycol mono methyl ether and 1.0 gram ethanol were then added to the flask while constantly stirring. The resulting solution comprised about 3% solids and the weight ratio of the fluorochemical acrylate polymer:polyurethane was about 1:1.

Example 17

A polyurethane polymer was prepared according to the above Procedure B 20 except that the "Desmodur" N 100 triisocyanate was replaced with "Desmodur" N3300 triisocyanate and the "Carbowax" 1450 ethylene glycol was replaced with "Carbowax" 400 ethylene glycol. In a 200 ml flask equipped with a mechanical stir, 80.5 grams deionized water, 5.0 grams of the fluorochemical acrylate polymer made according to the above Procedure A and 10 grams of the polyurethane were blended under constant stirring. 2.5 grams dipropylene glycol mono-n-butyl ether, 1.0 gram propylene glycol mono methyl ether and 1.0 gram ethanol were then added to the flask while constantly stirring. The resulting solution comprised about 3% solids and the weight ratio of the fluorochemical acrylate polymer:polyurethane was about 1:1.

Example 18

A composition was formulated as in Example 1 except that 72.5 grams of deionized water was used and the glycol ethers and the alcohol of Example 1 were substituted with 10 grams dipropylene glycol mono-n-propyl ether.

Example 19

99.45 grams of a composition prepared according to Example 1 was formulated as an aerosol with 0.2 grams morpholine, 0.2 grams sodium nitrite and 0.15 grams ammonium hydroxide solution (30% in water) with stirring. The liquid was packaged in an aerosol can and 5.0 to 5.5 grams of isobutane was added as a propellant.

Comparative Example A

In a 200 ml flask equipped with a mechanical stir, 85.5 grams deionized water and 10 grams of a fluorochemical acrylate polymer made according to the above Procedure A were blended under constant stirring. 2.5 grams dipropylene glycol mono-n-butyl ether, 1.0 gram propylene glycol mono methyl ether and 1.0 gram ethanol were then added to the flask while constantly stirring. The resulting emulsion comprised about 3% solids.

Comparative Example B

In a 200 ml flask equipped with a mechanical stir, 70.5 grams deionized water and 25 grams of a blend made according to the above Procedure E were blended under constant stirring. 2.5 grams dipropylene glycol monoonobutyl ether, 1.0 gram propylene glycol mono methyl ether and 1.0 gram ethanol were then added to the flask while constantly stirring. The resulting emulsion comprised about 3% solids.

Comparative Example C

In a 200 ml flask equipped with a mechanical stir, 78 grams deionized water, 5 grams of a blend made according to the above Procedure G and 12.5 grams of a blend made according to the above Procedure E were blended under constant stirring. 2.5 grams dipropylene glycol mono-n-butyl ether, 1.0 gram propylene glycol mono methyl ether and 1.0 gram ethanol were then added to the flask while constantly stirring. The resulting emulsion comprised about 3% solids.

Comparative Example D

In a 200 ml flask equipped with a mechanical stir, 85.5 grams deionized water and 10 grams of a blend made according to the above Procedure G were blended under constant stirring. 2.5 grams dipropylene glycol mono-n-butyl ether, 1.0 gram propylene glycol mono methyl ether and 1.0 gram ethanol were then added to the flask with constant stirring. The resulting emulsion comprised about 3% solids.

Comparative Example E

A commercial solvent based fabric protector was selected for this Comparative Example E. The commercial product was an aerosol version of a fabric protector available under the trade designation "ScotchGard" from Minnesota Mining and Manufacturing Company of St. Paul, Minn.

Comparative Example F 99.45 grams of a composition prepared as in Comparative Example C was formulated as an aerosol with the addition of 0.2 grams morpholine, 0.2 grams sodium nitrite and 0.15 grams ammonium hydroxide solution (30% in water) with stirring. The composition was packaged in a 6–8 oz. (0.18–0.23 liter) aerosol can and 5.0–5.5 grams of isobutane were added as a propellant.

The compositions of the above Examples and the Comparative Examples were tested on different substrates according to the above Test Procedures. All substrates were prepared by hand-spraying 20.3cm by 22.9cm areas with the compositions. Care was taken to apply an even coverage of each composition used so that the dried add-on weight was about 2–3% of the weight of the dried fabric. The treated substrates were dried overnight at ambient conditions prior to testing.

The fabric substrates employed in the testing are identified as follows:

Fabric A is a bleached and washed polyester/cotton blend (65% polyester/35% cotton) commercially available under the style no. 7436 from Testfabrics, Inc. of Middlerex, N.J.

Fabric B is a cotton sateen (100% cotton) weave which is desized and bleached available under the style no. 428 from Testfabrics, Inc Fabric C is an untreated, unfinished green rayon velvet upholstery fabric available from Collins & Aikman, Decorative Fabrics Division of Roxboro, N.C.

Fabric D is a polypropylene velvet upholstery fabric available under the style no. 62521 from Joan Fabrics of Lowell, Mass.

Fabric E is a woven upholstery fabric comprising 48% olefin/18% rayon/34% polyester available under the style no. 9352 from Chromatex of West Hazelton, Pa.

Examples 1–18 and Comparative Examples A–E

Examples 1–18 and Comparatives A–E were tested according to the above Test Methods on Fabrics A and B. The comparative data is given below in Tables 4 (Fabric A) and 5 (Fabric B).

TABLE 4

(Comparative Data-Fabric A)

| Example | Water Repellency | Oil Repellency | Abraded Oil | Spray Rating | Wet Through | Composite | Aerosol Stability* |
|---|---|---|---|---|---|---|---|
| 1 | 9.7 ± 1.0 | 6.0 ± 0.2 | 5.5 ± 0.7 | 66 ± 6 | 5.8 ± 0.8 | 34 ± 2 | Yes |
| Comparative A | 9.8 ± 0.9 | 6.0 ± 0.2 | 3.8 ± 1.6 | 66 ± 6 | 5.9 ± 0.4 | 32 ± 2 | No |
| Comparative B | 5.0 ± 2.0 | 5.4 ± 1.4 | 5.3 ± 0.5 | 54 ± 8 | 2.7 ± 2.3 | 24 ± 3 | Yes |
| Comparative C | 4.0 | 4.3 | 4.0 | 63 | 2.0 | 21 | Yes |
| Comparative D | 4.0 | 4.3 | 2.8 | 63 | 4 | 21 | No |
| 2 | 5 | 5 | 4.8 | 58 | 3 | 24 | |
| 3 | 7 | 6 | 6 | 62 | 4 | 29 | |
| 4 | 10 | 6.3 | 3.5 | 65 | 6 | 32 | |
| 5 | 10 | 6 | 4.3 | 68 | 6 | 33 | |
| 6 | 5 | 2.5 | 2 | 64 | 3 | 19 | |
| 7 | 10 | 7 | 6 | 64 | 6 | 35 | |
| 8 | 6 | 5.5 | 5.5 | 58 | 5 | 28 | |
| 9 | 9 | 5.3 | 5 | 67 | 6 | 32 | |
| 10 | 9 | 6 | 5 | 67 | 6 | 33 | |
| 11 | 6 | 4.5 | 3.8 | 63 | 5 | 26 | |
| Comparative E | 9 | 5.5 | 4 | 72 | 5 | 31 | Yes |
| 12 | 9 | 5.5 | 4.8 | 65 | 6 | 32 | |
| 13 | 10 | 6.3 | 6 | 67 | 6 | 35 | |
| 14 | 9 | 5.3 | 5 | 67 | 6 | 32 | |
| 15 | 10 | 6 | 5.5 | 67 | 6 | 34 | |
| 16 | 8 | 4.5 | 4.3 | 64 | 5 | 28 | |
| 17 | 8 | 4.3 | 3.8 | 66 | 5 | 28 | |
| 18 | 10 | 6 | 5.8 | 65 | 6 | 34 | |

*Indicates whether Example could be blended as an aerosol by the addition of corrosion inhibitors and aerosol propellant as in the preparation of Example 19 above.

TABLE 5

(Comparative Data-Fabric B)

| Example | Water Repellency | Oil Repellency | Abraded Oil | Spray Rating | Wet Through | Composite | Aerosol Stability* |
|---|---|---|---|---|---|---|---|
| 1 | 9.3 ± 1.0 | 5.8 ± 0.8 | 5.5 ± 0.9 | 65 ± 5 | 6.0 ± 0.0 | 33 ± 3 | Yes |
| Comparative A | 9.6 ± 1.1 | 6.0 ± 0.0 | 5.1 ± 1.0 | 64 ± 4 | 5.7 ± 0.9 | 33 ± 2 | No |
| Comparative B | 5.0 ± 0.0 | 5.3 ± 0.5 | 5.3 ± 1.2 | 54 ± 8 | 3.3 ± 1.2 | 24 ± 2 | Yes |
| Comparative C | 5.0 ± 0.0 | 4.0 ± 0.0 | 4.0 ± 0.0 | 63 ± 1 | 3.5 ± 1.4 | 23 ± 2 | Yes |
| Comparative D | 10 ± 0.0 | 5.0 ± 0.0 | 4.1 ± 0.4 | 63 ± 0 | 5.5 ± 1.4 | 31 ± 1 | No |
| 2 | 7 | 5 | 5 | 62 | 4 | 27 | |
| 3 | 9 | 5.8 | 6 | 63 | 5 | 32 | |
| 4 | 10 | 6.3 | 5.8 | 65 | 6 | 35 | |
| 5 | 10 | 6 | 5.3 | 65 | 6 | 34 | |
| 6 | 10 | 5 | 4.8 | 65 | 6 | 32 | |
| 7 | 10 | 6.3 | 6 | 65 | 6 | 35 | |
| 8 | 9 | 5 | 5.3 | 63 | 6 | 32 | |
| 9 | 9 | 5.3 | 5 | 65 | 6 | 32 | |
| 10 | 10 | 6 | 6 | 64 | 6 | 34 | |
| 11 | 6 | 3.8 | 3.5 | 64 | 5.5 | 25 | |
| Comparative E | 10 | 6 | 5 | 75 | 6 | 35 | Yes |
| 12 | 10 | 6.3 | 6 | 63 | 6 | 35 | |
| 13 | 10 | 6 | 5.8 | 64 | 6 | 34 | |
| 14 | 9 | 6 | 5 | 66 | 6 | 33 | |
| 15 | 10 | 6 | 6 | 65 | 6 | 35 | |
| 16 | 10 | 6 | 5.8 | 64 | 6 | 34 | |
| 17 | 10 | 6 | 5.8 | 64 | 6 | 34 | |
| 18 | 10 | 6 | 5.8 | 64 | 6 | 34 | |

*Indicates whether Example could be blended as an aerosol by the additive of corrosion and aerosol propellant as in the preparation of Example 19 above.

The above data shows the superior protective properties of the compositions of the invention as compared with the compositions of the Comparative Examples. Table 4, for example, shows the compositions of the present invention include a broader range of protective properties than the compositions of the Comparative Examples. Also, aerosol stability is typical for compositions of the invention.

The data for the fabric treated with the composition of Example 1 set forth in Table 4, for example, demonstrates better abraded oil resistance than the fabric treated with the composition of Comparative A. Also, the composition of Example 1 provides aerosol stability which is not provided by the Comparative A composition. The data for the Comparatives B–D show markedly poorer performance than the inventive composition of Example 1 in almost all of the testing conducted. As shown by a comparison of the data for Example 1 with that for Examples 2–7, the repellent properties of the inventive compositions are influenced by the relative weight ratios well as the percent solids of components within the compositions. Examples 8–11 represent inventive compositions made from monomers different than those used in the formulation of Example 1.

Comparative E represents a solvent based formulation. The data demonstrates that the compositions of the invention provide oil and water repellency which is at least as effective as that provided by such a solvent based formulation (e.g. compare Comparative E with Example 1). Example 12–18 demonstrate the effectiveness of inventive compositions comprising variations of components, consistent with the above description.

Example 19 and Comparative Examples E and F

Comparative test data was collected for the aerosol preparations of Example 19 and Comparative Examples E and F. Data was collected for Fabrics A, B, C, D and E and is set forth in Table 6 below.

TABLE 6

| Example | Water Repellency | Oil Repellency | Abraded Oil | Spray Rating | Wet Through | Composite |
|---|---|---|---|---|---|---|
| Fabric A | | | | | | |
| 19 | 10 | 6 | 6 | 65 | 5 | 34 |
| Comparative F | 7 | 6 | 5 | 50 | 3 | 26 |
| Comparative E | 9 | 5.5 | 4 | 72 | 5 | 31 |
| Fabric B | | | | | | |
| 19 | 10 | 6 | 6 | 68 | 6 | 35 |
| Comparative F | 9 | 6 | 6 | 68 | 5 | 33 |
| Comparative E | 10 | 6 | 5 | 75 | 6 | 35 |
| Fabric C | | | | | | |
| 19 | 10 | 6.5 | 5.5 | 80 | 6 | 36 |
| Comparative F | 10 | 6.5 | 5.8 | 75 | 6 | 36 |
| Comparative E | 10 | 5 | 5 | 80 | 6 | 34 |
| Fabric D | | | | | | |
| 19 | 6 | 5.5 | 5.5 | 70 | 4 | 28 |
| Comparative F | 4 | 4.8 | 4.8 | 68 | 4 | 24 |
| Comparative E | 6 | 1.8 | 1.8 | 80 | 4 | 22 |
| Fabric E | | | | | | |
| 19 | 8 | 5.5 | 1.5 | 72 | 4 | 26 |
| Comparative F | 6 | 4.5 | 1.5 | 70 | 4 | 23 |
| Comparative E | 9 | 2 | 3.3 | 82 | 5 | 28 |

The above data demonstrates the superior protective abilities of the inventive composition of Example 19 when compared with the water-based aerosol formulations of Comparative Example F, especially for Fabrics A, D and E, as reflected in the composite scores. The water based aerosol of Example 19 gave at least comparable performance for the solvent based composition of Comparative Example E overall, with improved performance over Comparative E noted on Fabric D.

Although the preferred embodiments of the invention have been described in some detail herein, the described embodiments are meant as merely illustrative and are not to be construed as limiting in any way. Those skilled in the art will understand that various changes and modifications can be made to the described embodiments without departing from the true spirit and scope of the invention, as defined in the following claims.

We claim:

1. A composition for treating fiber containing substrates to impart improved oil and water repellency thereto, comprising:

(a) a polyalkoxylated polyurethane having pendant perfluoroalkyl groups, said polyalkoxylated polyurethane comprising the reaction product of an aliphatic or aromatic tri- or higher order isocyanate, a fluorinated alcohol, amine, or mercaptan, and a poly(oxyalkylene) diol or dithiol; and (b) a fluorochemical acrylate polymer comprising the reaction product of a fluorinated acrylate or methacrylate monomer, at least one alkyl acrylate or methacrylate monomer, and a polymerizable cationic emulsifier comprising a quaternary amine surfactant.

2. The composition as defined in claim 1 further comprising:

(c) an alkylene glycol fluorochemical acrylate copolymer comprising the reaction product of a fluorinated acrylate or methacrylate monomer, polyalkylene glycol acrylate or methacrylate, and polyalkylene glycol diacrylate or dimethacrylate; and (d) a fluorochemical adipate ester.

3. The composition as defined in claim 2 wherein said fluorochemical adipate ester is represented by the formula

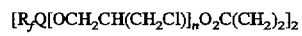

wherein $R_f$ is a fluoroaliphatic radical,

Q is an organic linking group, and n is a number from 1 to 5.

4. The composition as defined in claim 3 wherein said fluorochemical adipate ester is represented by the formula

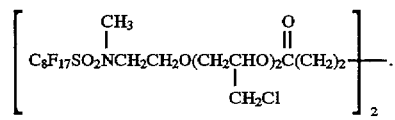

5. The composition as defined in claim 2 wherein the composition is a blend comprising a first component consisting of (a), (c), and (d), and a second component consisting of (b), said first component and said second component present in said blend at a weight ratio from 1:25 to 25:1.

6. The composition as defined in claim 5 wherein said first component and said second component within said blend are present at a weight ratio of about 1:1.

7. The composition as defined in claim 2 wherein said alkylene glycol fluorochemical acrylate polymer comprises the randomly arranged repeating units represented by

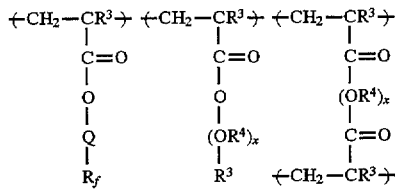

wherein $R_f$ is a fluoroaliphatic radical, each $R_3$ independently is H or $CH_3$, $R_4$ is an alkylene group having 2 to 4 carbon atoms, Q is an organic linking group and x is an integer from 5 to 100.

8. The composition as defined in claim 7 wherein said alkylene glycol fluorochemical acrylate polymer is a polyoxyethylene terpolymer of $$C_8F_{17}SO_2N(CH_3)C_2H_4OCOCH=CH_2, \qquad (a)$$

$$CH_2=C(CH_3)COO(CH_2CH_2O)_{76}H, \qquad (b)$$

and $$CH_2=C(CH_3)COO(CH_2CH_2O)_{76}COC(CH_3)=CH_2, \qquad (c)$$

in a weight ratio of a:(b+c) of 1:1 and a weight ratio of b:c of 3:1.

9. The composition as defined in claim 1 wherein said polyalkoxylated polyurethane is represented by the formula:

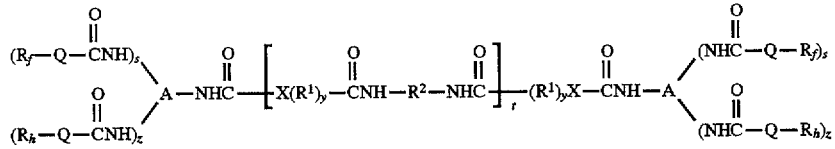

wherein $R_f$ is a fluoroaliphatic radical, $R_h$ is a non-fluorinated hydrocarbon radical, Q is an organic linking group, A is a residue of tri- or higher order isocyanate, i.e., the residue being that portion of the tri- or higher order isocyanate minus the reacted —NCO groups, $(R^1)_y$ is a poly(oxyalkylene) moiety, $R^1$ being an oxyalkylene group with 2 to 6 carbon atoms or a cyclic ether or ester moiety having 2 to 6 carbon atoms and y is a number of about 10 to 50, X is O, S or a linking group terminating in O or S, $R^2$ is a residue of a tri- or higher order isocyanate, two of the isocyanate groups of the tri- or higher order isocyanate forming the depicted urethane groups and the other isocyanate groups reacted to form pendant —$QR_f$ or —$QR_h$ groups, s is a number of at least 1 and can be 3 or higher, z is zero or a number of about 4 or higher, and t is a number of at least about 10.

10. The composition as defined in claim 1 wherein said fluorochemical acrylate polymer is represented by the general formula

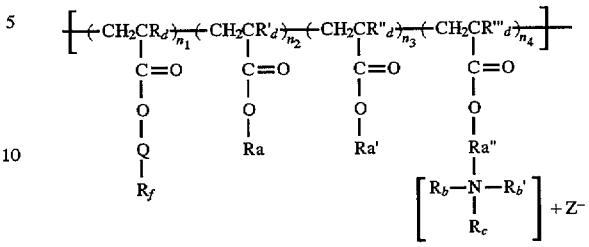

wherein $R_f$ is a fluoroaliphatic radical,

Q is an organic linking group, $R_b$ and $R_b'$ are the same or different and are selected from the group consisting of H and linear or branched hydrocarbons having from 1 to 4 carbon atoms or together forming a carbocyclic ring of from about 3 to about 12 members, and mixtures thereof, $R_d$, $R_d'$, $R_d''$, $R_d'''$ can be the same or different and are selected from the group consisting of H or —$CH_3$, $R_a$, $R_a'$, $R_a''$ can be the same or different and are selected from the group consisting of an alkyl group having from 1 to 18 carbon atoms, $R_c$ is a saturated aliphatic (linear or branched) or cyclic alkyl, or a combination of cyclic and aliphatic alkyls having at least 1 and generally from 4 to 30 carbon atoms, and preferably from 8 to 20 carbon atoms;

Z is an anion selected from the group consisting of chloride, bromide, iodide, sulfonate, alkyl sulfonate, phosphate, and mixtures thereof;

$n_1$, $n_2$, and $n_3$ are numbers which may independently range from 10 to 70, and $n_4$ is a number which is at least 1 and generally is within the range from 1 to 6.

11. The composition as defined in claim 10 wherein said fluorochemical acrylate polymer is represented by the formula

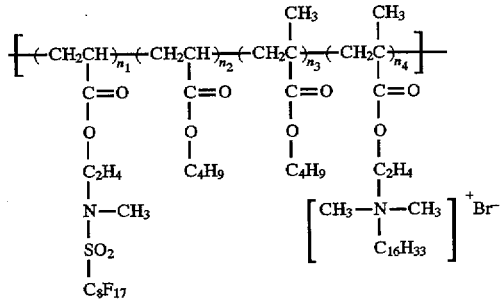

12. The composition as defined in claim 1 wherein said fluorinated acrylate or methacrylate monomer of said fluorochemical acrylate polymer is selected from the group consisting of N-methyl perfluoro octylsulfonamidoethyl methacrylate, N-ethyl perfluoro octylsulfonamidoethyl methacrylate, N-methyl perfluoro octylsulfonamidoethyl acrylate, N-ethyl perfluoro octylsulfonamidoethyl acrylate and combinations thereof.

13. The composition as defined in claim 1 wherein said at least one alkyl acrylate or methacrylate monomer of said fluorochemical acrylate polymer is selected from the group consisting of methylacrylate, ethylacrylate, butylacrylate, hexylacrylate, isooctylacrylate, isodecylacrylate, ethylmethacrylate, butylmethacrylate, cyclohexylmethacrylate and mixtures thereof.

14. The composition as defined in claim 13 wherein said butylacrylate is n-butyl acrylate and said butylmethacrylate is n-butyl methacrylate.

15. The composition as defined in claim 1 wherein said polymerizable cationic emulsifier comprises a quaternary ammonium salt of the general formula

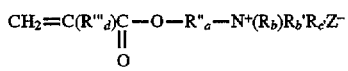

wherein $R_a''$ is an alkyl group having 1 to 18 carbon atoms, $R_b$ and $R_b'$ are the same or different and are selected from the group consisting of H and linear or branched hydrocarbons having from 1 to 4 carbon atoms or together forming a carbocyclic ring of from about 3 to about 12 members, and mixtures thereof, $R_d'''$ is —H or —$CH_3$, $R_c$ is a saturated aliphatic (linear or branched) or cyclic alkyl, or a combination of cyclic and aliphatic alkyls having at least 1 and generally from 4 to 30 carbon atoms, and preferably from 8 to 20 carbon atoms, and Z is an anion selected from the group consisting of chloride, bromide, iodide, sulfonate, alkyl sulfonate, phosphate, and mixtures thereof.

16. The composition as defined in claim 1 wherein said polymerizable cationic emulsifier comprises the reaction product of N,N-dimethylaminoethyl methacrylate and an alkyl halide having a carbon chain length from about 4 to about 30 carbon atoms.

17. The composition as defined in claim 16 wherein said alkyl halide is hexadecylbromide.

18. A method for the treatment of fiber containing substrates, comprising:
applying the composition of claim 1 at ambient conditions to said substrate; and
drying said substrate at ambient conditions.

19. Substrates treated with the composition of claim 1.

20. A composition for treating fiber containing substrates to impart improved oil and water repellency thereto, comprising:

(a) a polyalkoxylated polyurethane having pendant perfluoroalkyl groups, said polyurethane comprising the reaction product of an aliphatic or aromatic tri- or higher order isocyanate, a fluorinated alcohol, amine, or mercaptan, and a poly(oxyalkylene) diol or dithiol;

(b) a fluorochemical acrylate polymer comprising the polymerized reaction product of a fluorinated acrylate or methacrylate monomer, a first alkyl acrylate or methacrylate monomer, a second alkyl acrylate or methacrylate monomer, and a polymerizable cationic emulsifier comprising a quaternary amine surfactant;

(c) a polyalkylene glycol fluorochemical acrylate copolymer comprising the reaction product of a fluorinated acrylate or methacrylate monomer, polyalkylene glycol acrylate or methacrylate, and polyalkylene glycol diacrylate or dimethacrylate; and (d) a fluorochemical adipate ester wherein the above components are blended together in a weight ratio of (a)+(c)+(d):(b) within the composition of from 25:1 to 1:25.

21. The composition as defined in claim 20 wherein said polyalkoxylated polyurethane is represented by the formula

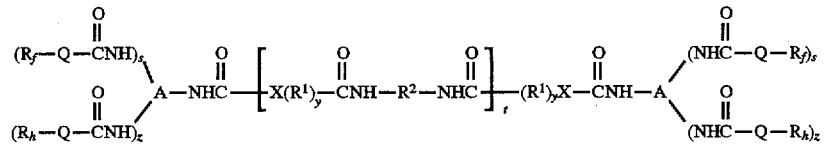

wherein $R_f$ is a fluoroaliphatic radical, $R_h$ is a non-fluorinated hydrocarbon radical, Q is an organic linking group, A is a residue of tri- or higher order isocyanate, i.e., the residue being that portion of the tri- or higher order isocyanate minus the reacted —NCO groups, $(R^1)_y$ is a poly(oxyalkylene) moiety, $R^1$ being an oxyalkylene group with 2 to 6 carbon atoms and y is a number of about 20 to 40, X is O, S or a linking group terminating in O or S, $R^2$ is a residue of a tri- or higher order isocyanate, two of the isocyanate groups of the tri- or higher order isocyanate forming the depicted urethane groups and the other isocyanate groups reacted to form pendant —$QR_f$ or —$QR_h$ groups, s is a number of at least 1 and can be 3 or higher, z is zero, and t is a number of at least about 10.

22. The composition as defined in claim 20 wherein said alkylene glycol fluorochemical acrylate polymer is a polyoxyethylene terpolymer of

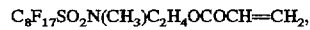 (a)

 (b)

and

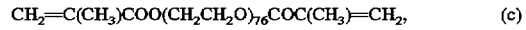 (c)

in a weight ratio of a:(b+c) of 1:1 and a weight ratio of b:c of 3:1.

23. The composition as defined in claim 20 wherein said fluorochemical adipate ester is represented by the formula $$[C_8F_{17}SO_2NCH_2CH_2O(CH_2CHO)_2C(CH_2)_2]_{\overline{2}}$$
with side groups $CH_3$ and $CH_2Cl$, and $C=O$ 24. The composition as defined in claim 20 wherein said fluorochemical acrylate polymer is represented by the general formula $$+ \!\!\!\!-(CH_2CR_d)_{n_1}-(CH_2CR'_d)_{n_2}-(CH_2CR''_d)_{n_3}-(CH_2CR'''_d)_{n_4}\!\!\!\!-+$$

with pendant groups $C=O$, $O$, $Q$, $R_f$; $C=O$, $O$, $R_a$; $C=O$, $O$, $R_a'$; $C=O$, $O$, $R_a''$; and $\left[\begin{array}{c}R_b-\!\!\!N-\!\!\!R_b'\\|\\R_c\end{array}\right]^+ Z^-$ wherein $R_f$ is a fluoroaliphatic radical, Q is an organic linking group, $R_b$ and $R_b'$ are the same or different and are selected from the group consisting of H and linear or branched hydrocarbons having from 1 to 4 carbon atoms or together forming a carbocyclic ring of from about 3 to about 12 members, and mixtures thereof, $R_d$, $R_d'$, $R_d''$, $R_d'''$ can be the same or different and are selected from the group consisting of H or —$CH_3$, $R_a$, $R_a'$, $R_a''$ can be the same or different and are selected from the group consisting of an alkyl group having from 1 to 18 carbon atoms, $R_c$ is a saturated aliphatic (linear or branched) or cyclic alkyl, or a combination of cyclic and aliphatic alkyls having at least 1 and generally from 4 to 30 carbon atoms, and preferably from 8 to 20 carbon atoms;

Z is an anion selected from the group consisting of chloride, bromide, iodide, sulfonate, alkyl sulfonate, phosphate, and mixtures thereof;

$n_1$, $n_2$, and $n_3$ are numbers which may independently range from 10 to 70, and $n_4$ is a number which is at least 1 and generally is within the range from 1 to 6.

25. The composition as defined in claim 24 wherein said fluorochemical acrylate polymer is represented by the formula $$+ \!\!\!\!-(CH_2CH)_{n_1}-(CH_2CH)_{n_2}-(CH_2C\overset{CH_3}{|})_{n_3}-(CH_2\overset{CH_3}{\underset{|}{C}})_{n_4}\!\!\!\!-+$$

with pendant groups: $C=O$, $O$, $C_2H_4$, $N-CH_3$, $SO_2$, $C_8F_{17}$; $C=O$, $O$, $C_4H_9$; $C=O$, $O$, $C_4H_9$; $C=O$, $O$, $C_2H_4$, $\left[\begin{array}{c}CH_3-\!\!\!N-\!\!\!CH_3\\|\\C_{16}H_{33}\end{array}\right]^+ Br^-$ 26. The composition as defined in claim 20 wherein said fluorinated acrylate or methacrylate monomer of said fluorochemical acrylate polymer is selected from the group consisting of N-methyl perfluoro octylsulfonamidoethyl methacrylate, N-ethyl perfluoro octylsulfonamidoethyl methacrylate, N-methyl perfluoro octylsulfonamidoethyl acrylate, N-ethyl perfluoro octylsulfonamidoethyl acrylate and combinations thereof.

27. The composition as defined in claim 20 wherein said at least one alkyl acrylate or methacrylate monomer of said fluorochemical acrylate polymer is selected from the group consisting of methylacrylate, ethylacrylate, butylacrylate, hexylacrylate, isooctylacrylate, isodecylacrylate, ethylmethacrylate, butylmethacrylate, cyclohexylmethacrylate and combinations thereof.

28. The composition as defined in claim 27 wherein said butylacrylate is n-butyl acrylate and said butylmethacrylate is n-butyl methacrylate.

29. The composition as defined in claim 20 wherein said polymerizable cationic emulsifier comprises a quaternary ammonium salt of the general formula $$CH_2\!\!=\!\!C(R'''_d)\overset{\text{\tiny{||}}}{\underset{O}{C}}\!\!-\!\!O\!\!-\!\!R_c\!\!-\!\!N^+(R_b)R_b'R_c'\!\cdot\!Z^-$$

wherein $R_a$ is an alkyl group having 1 to 18 carbon atoms, $R_b$ and $R_b'$ are the same or different and are selected from the group consisting of H and linear or branched hydrocarbons having from 1 to 4 carbon atoms or together forming a carbocyclic ring of from about 3 to about 12 members, and mixtures thereof, $R_d'''$ is —H or —$CH_3$, $R_c$ is a saturated aliphatic (linear or branched) or cyclic alkyl, or a combination of cyclic and aliphatic alkyls having at least 1 and generally from 4 to 30 carbon atoms, and preferably from 8 to 20 carbon atoms, and Z is an anion selected from the group consisting of chloride, bromide, iodide, sulfonate, alkyl sulfonate, phosphate, and mixtures thereof.

30. The composition as defined in claim 20 wherein said polymerizable cationic emulsifier comprises the reaction product of N,N-dimethylaminoethyl methacrylate and an alkyl halide having a carbon chain length from about 4 to about 30 carbon atoms.

31. The composition as defined in claim 30 wherein said alkyl halide is hexadecylbromide.

32. The composition as defined in claim 20 wherein said fluorochemical adipate ester is represented by the formula $$[R_fQ[OCH_2CH(CH_2Cl)]_nO_2C(CH_2)_2]_2$$

wherein $R_f$ is a fluoroaliphatic radical,

Q is an organic linking group, and n is a number from 1 to 5.

33. The composition as defined in claim 32 wherein said fluorochemical adipate ester is represented by the formula $$[C_8F_{17}SO_2NCH_2CH_2O(CH_2CHO)_2C(CH_2)_2]_{\overline{2}}$$
with $CH_3$ and $CH_2Cl$ substituents 34. A method for the treatment of fiber containing substrates comprising:

applying the composition of claim 20 at ambient conditions to said substrate; and drying said substrate at ambient conditions.

35. Substrates treated with the composition of claim 20.

* * * * *